US007061704B2

United States Patent
Dunn (10) Patent No.: US 7,061,704 B2
(45) Date of Patent: Jun. 13, 2006

(54) TECHNIQUES FOR DETECTING POLARITY REVERSALS OF A DISK DRIVE READ/WRITE HEAD

(75) Inventor: George A. Dunn, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 12 days.

(21) Appl. No.: 10/649,580

(22) Filed: Aug. 26, 2003

(65) Prior Publication Data

US 2005/0046986 A1 Mar. 3, 2005

(51) Int. Cl.
*G11B 5/09* (2006.01)
(52) U.S. Cl. .............................. 360/39; 360/48; 360/50
(58) Field of Classification Search .................. 360/39, 360/29, 46, 66, 51, 59, 77.08
See application file for complete search history.

(56) References Cited

U.S. PATENT DOCUMENTS 5,901,003 A 5/1999 Chainer et al.
6,295,175 B1 * 9/2001 Tomita et al. ................ 360/31
6,369,969 B1 * 4/2002 Christiansen et al. ......... 360/66
2002/0063984 A1 5/2002 McClellan et al.
2003/0030929 A1 2/2003 Ozdemir

FOREIGN PATENT DOCUMENTS

EP 0989556 A1 3/2000

* cited by examiner

*Primary Examiner*—David Hudspeth
*Assistant Examiner*—Daniell L. Negrón
(74) *Attorney, Agent, or Firm*—Townsend and Townsend and Crew LLP (57) ABSTRACT

Techniques are provided for detecting and correcting polarity reversals in signals generated by read/write heads that are used to read magnetic data. Directional patterns are stored in regions of each data track. The directional patterns are used to indicate whether the read/write head has reversed polarity. The read sensor reads the directional patterns along with other data stored on the disk. Electronic circuitry decodes the directional patterns to determine if the read/write head has reversed polarity. If the circuitry determines that the polarity of the read/write head has reversed, the circuitry reverses the polarity of output signals generated by the read sensor to correct for the polarity reversal of the head.

24 Claims, 4 Drawing Sheets

TECHNIQUES FOR DETECTING POLARITY REVERSALS OF A DISK DRIVE READ/WRITE HEAD

BACKGROUND OF THE INVENTION

The present invention relates to techniques for detecting the output polarity of a disk drive read/write head, and more particularly, to a techniques for determining whether the polarity of a disk drive read/write head has reversed direction and correcting for a reversal when it occurs.

Magnetic disk drive systems include an actuator that is used to read and to write data on magnetic hard disks. An actuator moves a read/write head over the disk to read magnetic data. Magnetic data is stored on a magnetic disk in concentric data tracks. The read/write head has a write element that writes magnetic data onto the disk and a read sensor that reads magnetic data stored on the disk.

The read sensor detects positive and negative magnetic transitions on the disk and generates a linear signal that indicates these transitions. The read/write head has a polarity that effects the direction of transitions in the linear output signal. Various conditions such as high temperatures or mechanical stress can cause the polarity of a read/write head to reverse direction. When the polarity of the read/write head reverses direction, transitions in the linear output signal of the read/write head are reversed relative to the corresponding transitions on the disk. For example, positive magnetic transitions on the disk are incorrectly represented by the linear output signal as negative transitions.

Magnetic disks also contain servo sample regions. Servo information stored in the servo sample regions is used to keep the read/write head on the correct data track. The read sensor reads the servo information stored in the servo sample regions to determine if the read/write head is moving toward the inner diameter of the disk or toward the outer diameter of the disk.

The magnetic disk has a unique magnetic pattern at the beginning of the servo sample region, that is polarity sensitive, to allow the servo system to separate the servo sample region from other information on the disk. This unique pattern is known as a servo address mark. The actuator uses part of the servo information to correct movements in the read/write head that are needed to keep the read sensor on the correct data track. The actuator also uses the servo information to move the read/write head from one data track to another.

When the polarity of the read/write head reverses, the read sensor misreads the servo address mark information stored in the servo samples. When the actuator moves the read/write head based on the misread servo address mark information, it cannot keep the read/write head on the center of the data track. Instead, the read/write head may be moved in the wrong direction, and the track following or seeking system completely malfunctions. As a result, polarity reversals of the read/write head can have disastrous effects on the operation of a magnetic disk drive system.

Therefore, there is a need to detect polarity reversals of read/write heads that are used to read magnetic data and to correct for these polarity reversals.

BRIEF SUMMARY OF THE INVENTION

The present invention provides techniques for detecting and correcting polarity reversals in signals generated by read/write heads that are used to read magnetic data. According to the present invention, directional patterns are stored in regions of each data track. The directional patterns are used to indicate whether the read/write head has reversed polarity.

The read sensor reads the directional patterns along with other data stored on the disk. Electronic circuitry decodes the directional patterns to determine if the read/write head has reversed polarity. If the circuitry determines that the polarity of the read/write head has reversed, the circuitry reverses the polarity of the output signals generated by the read/write head to correct for the polarity reversal of the head.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
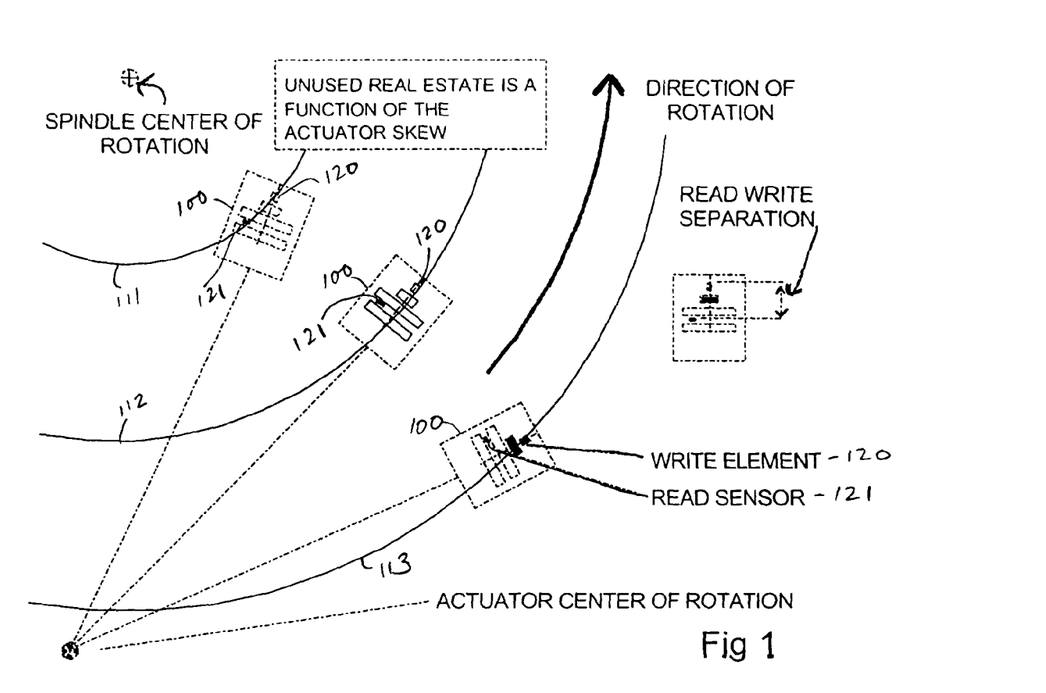
FIG. 1 illustrates how a read/write head writes data onto and reads data from a magnetic disk.

FIG. 1 illustrates how a read/write head 100 is positioned to write and read data on a magnetic disk. An actuator rotates read/write head 100 across the disk to read any of the data tracks. For example, read/write head 100 is positioned over data tracks 111–113 in FIG. 1. Data tracks 111–113 rotate around the spindle center of rotation.

Read/write head 100 includes a write element 120 and a read sensor 121. Read/write head 100 rotates around the actuator center of rotation. As can be seen in FIG. 1, write element 120 and read sensor 121 are often not positioned directly over the same data track at the same time.

Figure 2:
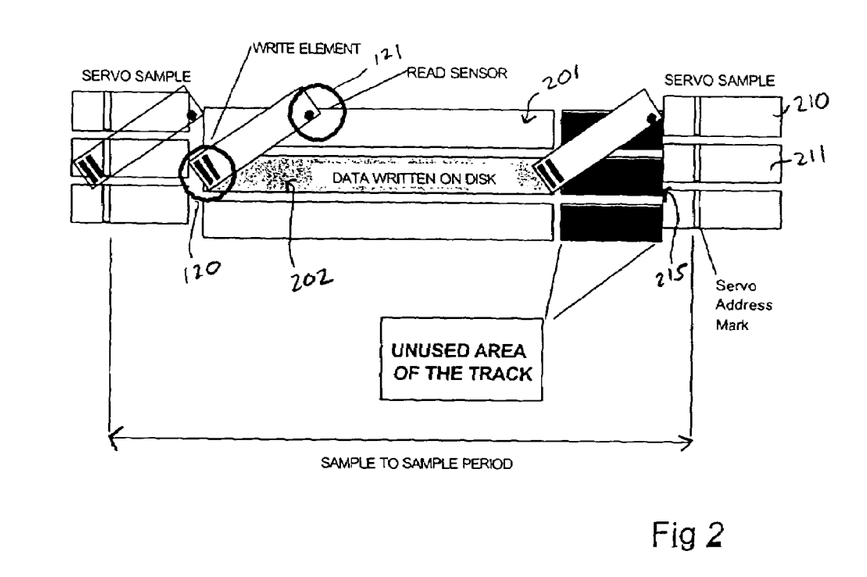
FIG. 2 illustrates how a write element is prevented from writing data onto unused areas of data tracks before servo samples on a magnetic disk.

FIG. 2 illustrates this point in further detail. In FIG. 2, read sensor 121 is positioned over data track 201, while write element 120 is positioned over adjacent data track 202. The read/write head moves over data tracks 201–202 from left to right in FIG. 2.

Each data track includes many servo sample regions. Each servo sample region includes a servo address mark that allows the servo system to separate the servo sample region from other information on the disk. The servo address mark also indicates the sample-to-sample period between each servo sample on a data track. Each servo sample region also includes servo data that is used to keep the read/write head on the correct data track, as discussed above.

A user's data is written onto the magnetic disk in between the servo samples. The disk drive system protects the servo samples from being overwritten by a user's data. The read sensor 121 reads the servo data each time it passes over one of the servo samples.

The read/write head cannot read and write data at the same time. While read sensor 121 is reading servo data in servo sample 210, write element 120 passes over region 215 of data track 202. Therefore, when read sensor 121 reads the servo information in a servo sample such as servo sample 210, write element 120 cannot write any data into region 215.

Read sensor 121 must attempt to read the servo data in each of the servo sample regions to ensure that the read/write head is in the correct position with respect to the data track being read or written. For these reasons, there is an unused area of each data track before a servo sample, because a user's data cannot be written onto that area of the data track. The unused areas of three data tracks are shown in FIG. 2.

Figure 3:
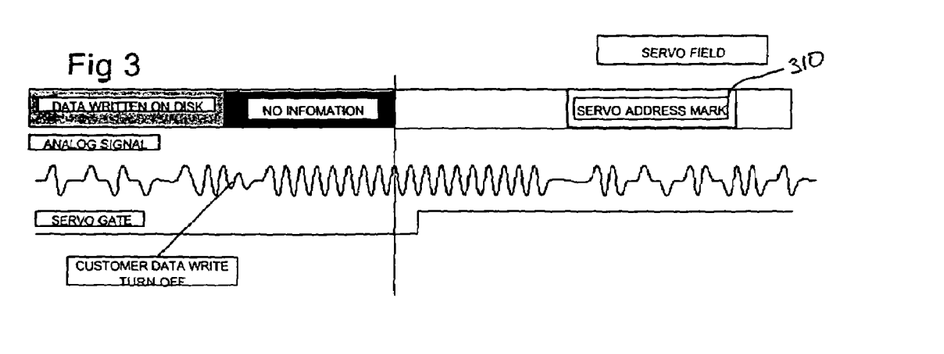
FIG. 3 illustrates analog signals associated with data encoded on a data track of a magnetic disk including blank data stored in an unused area of the data track.

FIG. 3 illustrates an example of an electrical analog signal that is generated by a read sensor of a read/write head for a disk drive system. The read sensor generates the analog signal in response to reading data encoded on the magnetic disk. A user's data is encoded as a series of magnetic transitions in the data portions of each data track. The read sensor senses the magnetic transitions and converts this information into the analog signal.

When the read sensor passes over the unused area of a data track, the analog signal indicates that no data is stored in this region. When the write element passes over the unused area of a data track, the disk drive system prevents the write element from writing a user's data into the unused area so that the read sensor can always read the servo data in the adjacent servo sample. FIG. 3 shows an example of a servo address mark 310 stored in a servo sample area of a data track.

The servo gate signal shown in FIG. 3 indicates whether the data encoded in the analog signal is interpreted as user data or servo data. When the servo gate signal is LOW, to disk drive system interprets the analog signal as containing a user's data. When the servo gate signal is HIGH, the disk drive system interprets the analog signal as containing servo data.

Figure 4:
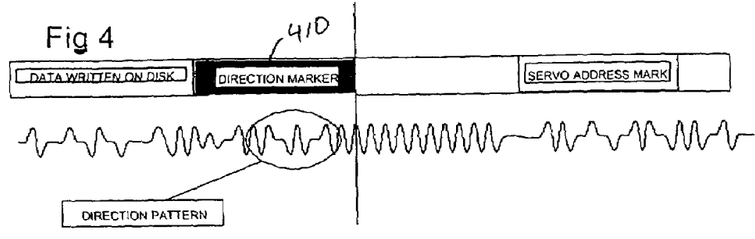
FIG. 4 illustrates analog signals associated with data encoded on a data track of a magnetic disk including direction pattern data that is used to detect polarity reversals in a read/write head of a magnetic disk drive system according to an embodiment of the present invention.

As discussed above, a read/write head of a magnetic disk drive can in some cases, reverse polarity. Such a polarity reversal causes the disk drive system to malfunction. FIG. 4 illustrates how a direction pattern can be stored in the unused areas of the data tracks of a magnetic disk to detect polarity reversals of the read/write head. The direction pattern can be stored in each of the previously unused areas of the data tracks that precede the servo samples. The direction patterns are stored in the previously unused areas of the data tracks during the manufacture of the magnetic disk, because the write element cannot write onto the previously unused areas during the normal use of the disk, as discussed above.

The areas of the data tracks where the direction patterns are stored are referred to as direction marker regions 410 in FIG. 4. When the read sensor of the read/write head passes over the direction marker regions of each data track, the read sensor reads the direction pattern information stored in these regions. The analog signal output of the read sensor contains the direction pattern information read from each direction marker region. The read sensor then continues to read all of the other information stored in the data tracks alongside the direction marker.

The read sensor of a magnetic disk drive system typically outputs a differential analog signal to achieve common mode noise reduction. The differential analog output signal is input into electronic circuitry 510 as shown, for example, in FIG. 5. Circuitry 510 includes a differential amplifier and a differential digital buffer circuit. The differential amplifier amplifies the difference between the two differential analog signals at its positive and negative inputs. The differential buffer outputs digital HIGH and LOW signals at its positive and negative outputs that depend upon whether the output signal of the differential amplifier is above or below a threshold of the differential buffer circuit.

Figure 5:
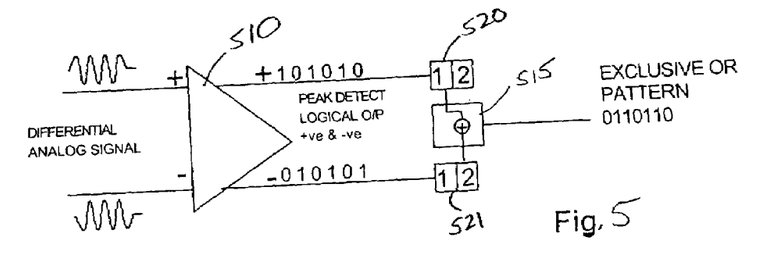
FIG. 5 illustrates electronic circuitry that is used to decode direction pattern data to determine if a read/write head of a magnetic disk drive system has reversed polarity according to an embodiment of the present invention.

For example, the differential buffer outputs a 1 at its positive output and a 0 at its negative output when the output signal of the differential amplifier is above the threshold. The differential buffer outputs a 0 at its positive output and a 1 at its negative output when the output signal of the differential amplifier is below the threshold. Thus, circuit 510 converts a differential analog signal into a differential digital signal.

Circuit 510 can be controlled by a clock signal. Circuit 510 can output a set of two complimentary bits in each clock cycle.

Circuit 510 outputs a stream of differential digital bits as shown, for example, in FIG. 5. The bits generated at the positive output of circuit 510 are stored in shift registers 520, and the bits generated at the negative output of circuit 510 are stored in shift registers 521. Shift registers 520 and 521 each have two registers. Shift registers 520 and 521 each store two data bits at a time in each of their registers. The clock signal controls the shifting of bits through shift registers 520–521.

The circuitry of FIG. 5 also includes exclusive OR (XOR) gate 515. XOR gate 515 has one input coupled to the first register of shift registers 520. XOR gate 515 has another input coupled to the second register of shift registers 521. Thus, XOR gate 515 performs an exclusive OR Boolean operation on the bit generated at the positive output of circuit 510 in the current clock cycle with the bit that was generated at the negative output of circuit 510 in the previous clock cycle. The output of XOR gate 515 is a series of bits that is analyzed to determine whether the read/write head of the disk drive has reversed polarity.

Figure 6:
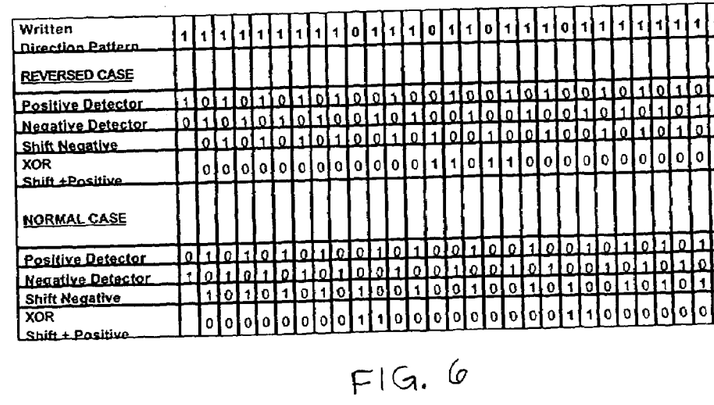
FIG. 6 illustrates examples of digital signals that are associated with the circuitry shown in FIG. 5 including a specific example of a direction pattern according to an embodiment of the present invention.

FIG. 6 is a table that includes examples of data bits that can be processed and generated by the circuitry of FIG. 5. The first row of FIG. 6 illustrates an example of a sequence of direction pattern data bits that can be written into regions 410 of a magnetic disk during manufacture.

The table of FIG. 6 examples of data bits that are read by a read sensor and processed when the polarity of read/write head has reversed (reversed case) and when the polarity of the read/write head has not reversed (normal case). The two rows labeled 'positive detector' in each case contain examples of bits that are generated at the positive output of circuit 510. The bits in the positive detector row are initially stored in the first register of shift registers 520. The two rows labeled 'negative detector' in each case contain examples of bits that are generated at the negative output of circuit 510.

The two rows labeled 'shift negative' in FIG. 6 contain examples of bits that are stored in the second register of shift registers 521. Each bit stored in the second register of shift registers 521 corresponds to the bit generated at the negative output of circuit 510 in the previous cycle. Thus, the bits in the 'shift negative' row are shifted forward by one bit with respect to the bits in the 'negative detector' row.

The two rows labeled 'XOR shift+positive' in FIG. 6 contain examples of bits that are generated at the output of XOR gate 515. The bits in the 'positive detector' row and in the 'shift negative' row are the inputs of XOR gate 515 in the example of FIG. 6. Thus, an XOR function is performed on the bits in these two input rows to generate the bits in the 'XOR shift+positive' row.

When the read sensor reads the direction pattern in the direction marker 410, XOR gate 515 generates a bit pattern that indicates whether the read/write head has reversed polarity. In FIG. 6, the bit patterns generated by XOR gate 515 when the read sensor reads the direction pattern in direction marker 410 are shown in the 'XOR shift+positive' row of the table.

Referring to the table of FIG. 6, XOR gate 515 outputs a bit pattern of 11011 and additional zeros, when the read/write head has reversed polarity in the 'reversed case.' XOR gate 515 outputs a bit pattern of 1100000000011 and additional zeros, if the read/write head has not reversed polarity in the 'normal case.' The disk drive system compares the bit pattern output by XOR gate 515 to the predetermined patterns 11011 and 1100000000011 to determine if the read/write head has reversed direction.

When XOR gate 515 outputs the bit pattern 11011, the disk drive system determines that the polarity of the read/write head has reversed direction. The disk drive system then reverses the polarity of the differential analog signal output by the read sensor to correct for the polarity reversal. The correction is necessary so that the disk drive system correctly interprets the servo data stored in the servo samples. The servo data in the servo sample is polarity sensitive as discussed above.

When XOR gate 515 outputs the bit pattern 1100000000011, the disk drive system determines that the polarity reversal of the read/write head has not reversed direction. Therefore, the disk drive system does not make any corrections to the differential analog signal output by the read sensor.

The direction pattern shown in FIG. 6 is merely one example of a bit pattern that can be written into direction marker region 410 and used to determine whether the polarity of the read/write head has reversed direction. Many other bit patterns can also be stored in direction marker 410 and used to determine whether the polarity of the read/write head has reversed.

The direction pattern shown in the first row of FIG. 6 is particularly advantageous, because this direction pattern has a small number of bits and a high tolerance. Specifically, XOR gate 515 outputs a bit pattern including two sets of double ones (11) in response to the direction pattern shown in FIG. 6. In the reversed case, XOR gate 515 outputs one zero between the double ones (i.e., 11011). In the normal case, XOR gate 515 outputs nine zeros between the double ones (i.e., 1100000000011). The direction pattern shown in FIG. 6 has a high tolerance, because the difference between these two bit patterns is eight zero bits between the sets of double ones.

The read sensor may on occasion improperly read one or more of the bits in the direction pattern. Also, noise can cause the circuitry of FIG. 5 to generate bit errors at the output of XOR gate 515. However, even if XOR gate 515 outputs 7 or 8 zero bits between the two sets of double ones, the disk drive system can still easily distinguish this bit pattern as indicating the reverse case. The distinction is easy to make, because even with the bit errors, XOR gate 515 generates several more zero between the two sets of double ones than in the normal case.

Also, if XOR gate 515 outputs 2 or 3 bits between the two sets of double ones, the disk drive system identifies this output as indicating that the read/write head has not reversed polarity. This distinction can be made, because the XOR gate outputs substantially less zeros between the two sets of double ones than in the reverse case. Therefore, the direction pattern of FIG. 6 has a substantially high tolerance range that allows the disk drive system to distinguish between the reverse case and the normal case despite the introduction of some types of bit errors.

The threshold between the normal case and the reverse case can be set to any suitable value. For example, the disk drive system can decide that the read/write head has reversed polarity if there are six or more zeros between the two sets of double ones. The disk drive system can decide that the read/write head has not reversed polarity if there are one, two, three, four or five zeros between the two sets of double ones. As will be understood by one of skill in the art, many other thresholds are also possible.

Figure 7:
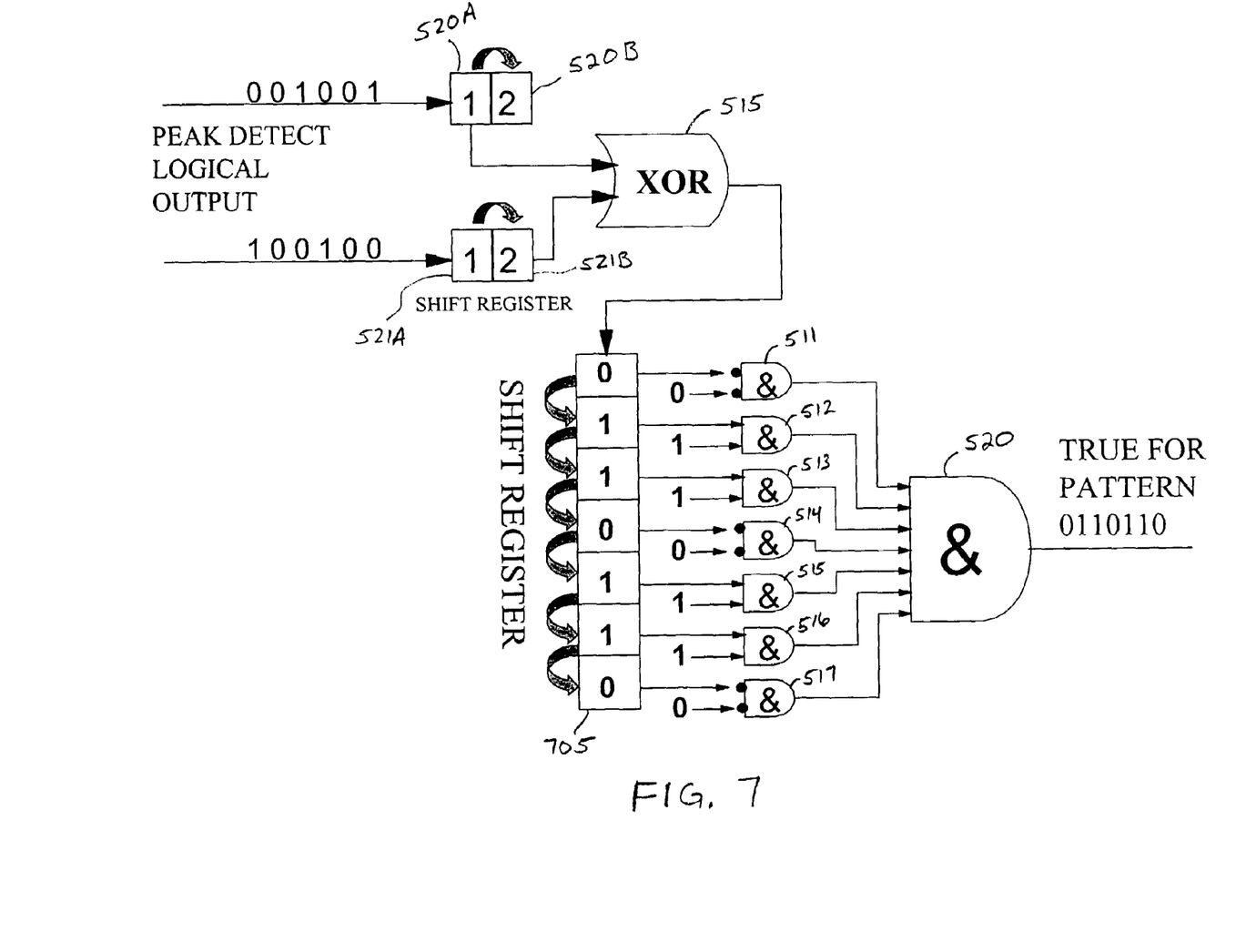
FIG. 7 illustrates circuitry that compares a decoded direction pattern data to a predetermined pattern of bits to determine of the if a read/write head has reversed polarity according to an embodiment of the present invention.

FIG. 7 illustrates an example of circuitry that compares a decoded direction pattern to a predetermined pattern of bits to determine if a read/write head of a disk drive system has reversed polarity. FIG. 7 illustrates shift registers 520, which include first register 520A and second register 520B. FIG. 7 also illustrates shift registers 521, which include first register 521A and second register 521B.

XOR gate 515 performs the exclusive OR Boolean function on the bit stored in register 520A and the bit stored in register 521B. The output bits of XOR gate 515 are stored in shift registers 705. Bits generated by XOR gate 515 are shifted in series through shift registers 705. During each clock cycle, the bits stored in shift registers 705 are shifted forward to the next register as shown by the arrows in FIG. 7. Shift registers 520, 521, and 705 are controlled by a clock signal.

Seven AND gates 511–517 perform the AND Boolean function on the bits stored in registers 705 and the predetermined binary bit pattern 0110110, as shown in FIG. 7. The bits 0110110 are a pre-selected pattern that indicate whether the read/write head has reversed polarity. XOR gate 515 generates bits 0110110 in response to reading the direction pattern in region 410 when the read/write head has reversed polarity. XOR gate does not generate 0110110 in response to reading the direction pattern when the read/write head has not reversed polarity.

AND gate 520 performs the AND function on all of the output signals of AND gates 511–517. The output of AND gate 520 is HIGH when the bits stored in registers 705 are 0110110. Therefore, a HIGH output signal at gate 520 indicates that the read/write head has reversed polarity. The output of AND gate 520 is LOW when the bits stored in registers 705 are not 0110110. A LOW output signal at gate 520 indicates that the read/write head has not reversed polarity.

The present invention can also include circuitry similar to the circuitry of FIG. 7 that compares the output signals of XOR gate 515 to another predetermined bit pattern 011000000000110 to determine if the read/write head has reversed polarity. The polarity of the read/write head has not reversed direction when XOR gate 515 generates bits 011000000000110 after the read sensor reads the direction pattern. The disk drive system can compare the output signals of XOR gate 515 to both bit patterns (0110110 and 011000000000110) or just one of the two bit patterns.

Under normal operating conditions when the read sensor is correctly reading the servo sample region, the direction pattern is ignored. When the servo system is expecting to read the servo sample region and fails to do so (e.g., after one or more unsuccessful servo read attempts), electronic circuitry senses the error and turns on the ability to read the direction pattern. The circuitry of FIGS. 5 and 7 then checks that the read/write head has the correct polarity output, as discussed above.

In summary, the present invention provides techniques for detecting and correcting a polarity reversal in a read/write head of a magnetic disk drive system. According to an embodiment of the present invention, a high tolerance direction pattern is encoded into previously unused areas of the data tracks that precede each servo sample. The read sensor reads the direction patterns. Circuitry of the present invention decodes the direction patterns to determine if the polarity of the read/write head has reversed. If the polarity of the read/write head has reversed, the output signals of read sensor can be corrected.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. Controller circuitry that detects polarity reversals in a read/write head of a disk drive system, the controller circuitry comprising:
    decoding circuitry for decoding a direction signal to provide a decoded signal, wherein the direction signal is generated by the read/write head in response to reading a directional pattern stored on a data track of a magnetic disk in an area of the data track between data portions of the data track for storing user data and a servo region; and
    comparing circuitry for determining if the decoded signal matches a first pattern that indicates whether the read/write head have reversed polarity.

2. The controller circuitry of claim 1 wherein the comparing circuitry includes a plurality of AND gates that compare the first pattern to the decoded signal.

3. The controller circuitry of claim 2 wherein:
    a tolerance between the first pattern and a second pattern is 8 bits.

4. The controller circuitry of claim 1 wherein the decoding circuitry includes an amplifier that amplifies differential read signals from the read/write head to generate an amplified read signal, a buffer that converts the amplified read signal into differential digital signals, and an exclusive OR gate that is coupled to receive the differential digital signals.

5. The controller circuitry of claim 4 wherein the exclusive OR gate performs an exclusive OR function on a first one of the differential digital signals generated in a current clock cycle and a second one of the differential digital signals generated in a previous clock cycle.

6. The controller circuitry of claim 1 wherein the direction patterns are written in regions of the data track that precede each servo sample.

7. The controller circuitry of claim 1 wherein the first pattern is 11011.

8. The controller circuitry of claim 1 wherein the directional pattern is stored on the data track of the magnetic disk in the area immediately preceding the servo region.

9. A disk drive system for reading magnetic recording media, the disk drive system comprising:
    a read/write head that includes a read sensor for reading data written onto data tracks on the magnetic recording media and generating a read signal, wherein the read sensor reads direction patterns stored in areas of the data tracks between data portions of the data tracks for storing user data and servo regions; and
    decoder circuitry for decoding the read signal to generate a decoded read signal and comparing the decoded read signal to a pattern to determine if the read/write head has reversed polarity,
    wherein the disk drive system reverses a polarity of the read signal if a portion of the decoded read signal matches the pattern, and the portion of the decoded read signal is generated in response to reading one of the direction patterns.

10. The disk drive system as defined in claim 9 wherein the decoder circuitry includes a plurality of AND gates that compare the decoded read signal to the pattern to determine whether the read/write head has reversed polarity.

11. The disk drive system as defined in claim 10 wherein the decoder circuitry includes a shift register coupled to inputs of the AND gates.

12. The disk drive system as defined in claim 9 wherein the decoding circuitry includes:
    an amplifier for amplifying the read signal to generate an amplified signal;
    a buffer for generating differential digital bits in response to the amplified signal;
    two sets of shift registers for storing the differential digital bits; and
    an exclusive OR gate coupled to two of the shift registers.

13. The disk drive system as defined in claim 12 wherein the exclusive OR gate performs an exclusive OR function on a first differential digital bit generated at a positive output of the buffer in a current clock cycle, and a second differential digital bit generated at a negative output of the buffer in a previous clock cycle.

14. The disk drive system as defined in claim 9 wherein the direction patterns are stored on the magnetic recording media before servo samples.

15. The disk drive system as defined in claim 9 wherein the pattern is 11011.

16. A disk drive system for reading magnetic recording media, the disk drive system comprising:
    means for writing direction patterns on data tracks of a magnetic disk in areas of the data tracks between data portions of the data tracks for storing user data and servo regions and reading the direction patterns to generate a polarity signal;
    means for determining if the polarity signal matches a first pattern; and
    means for reversing the polarity of signals generated by reading data on the data tracks if the polarity signal matches the first pattern.

17. The disk drive system as defined in claim 16 wherein the means for determining compares the polarity signal to a second pattern that indicates the means for writing and reading has not reversed polarity.

18. The disk drive system as defined in claim 17 wherein a tolerance between the first pattern and the second pattern is 8 bits.

19. The disk drive system as defined in claim 16 wherein the means for determining comprises:
  means for generating differential digital bits in response to the polarity signal; and
  means for performing an exclusive OR function on the differential digital bits.

20. The disk drive system as defined in claim 19 wherein the means for performing the exclusive OR functions performs the exclusive OR function on a first differential digital bit generated in a current clock cycle and a second differential digital bit generated in a previous clock cycle.

21. The disk drive system as defined in claim 19 wherein the first pattern is 11011.

22. Controller circuitry that detects polarity reversals in a read/write head of a disk drive system, the controller circuitry comprising:
  decoding circuitry for decoding a direction signal to provide a decoded signal, wherein the direction signal is generated by the read/write head in response to reading a directional pattern stored on a data track of a magnetic disk; and
  comparing circuitry for determining if the decoded signal matches a first pattern that indicates whether the read/write head have reversed polarity;
  wherein the comparing circuitry includes a plurality of AND gates that compare the first pattern to the decoded signal; and
  wherein a tolerance between the first pattern and a second pattern is 8 bits.

23. Controller circuitry that detects polarity reversals in a read/write head of a disk drive system, the controller circuitry comprising:
  decoding circuitry for decoding a direction signal to provide a decoded signal, wherein the direction signal is generated by the read/write head in response to reading a directional pattern stored on a data track of a magnetic disk; and
  comparing circuitry for determining if the decoded signal matches a first pattern that indicates whether the read/write head have reversed polarity;
  wherein the first pattern is 11011.

24. A disk drive system for reading magnetic recording media, the disk drive system comprising:
  a read/write head that includes a read sensor for reading data written onto data tracks on the magnetic recording media and generating a read signal, wherein the read sensor reads direction patterns is stored in regions of the data tracks; and
  decoder circuitry for decoding the read signal to generate a decoded read signal and comparing the decoded read signal to a pattern to determine if the read/write head has reversed polarity,
  wherein the disk drive system reverses a polarity of the read signal if a portion of the decoded read signal matches the pattern, and the portion of the decoded read signal is generated in response to reading one of the direction patterns;
  wherein the decoder circuitry includes a plurality of AND gates that compare the decoded read signal to the pattern to determine whether the read/write head has reversed polarity; and
  wherein the decoder circuitry includes a shift register coupled to inputs of the AND gates.

* * * * *

UNITED STATES PATENT AND TRADEMARK OFFICE
CERTIFICATE OF CORRECTION

PATENT NO. : 7,061,704 B2 Page 1 of 1
APPLICATION NO. : 10/649580
DATED : June 13, 2006
INVENTOR(S) : George A. Dunn

It is certified that error appears in the above-identified patent and that said Letters Patent is hereby corrected as shown below:

<u>Column 9, Line 15</u>

"claim 19" should read as --claim 16--.

Signed and Sealed this

Twenty-second Day of August, 2006

JON W. DUDAS
*Director of the United States Patent and Trademark Office*